United States Patent
Koganehira et al.

(10) Patent No.: US 7,494,538 B2
(45) Date of Patent: *Feb. 24, 2009

(54) INK SET, RECORDING METHOD AND RECORDED ARTICLE

(75) Inventors: Shuichi Koganehira, Shiojiri (JP); Hironori Sato, Shiojiri (JP); Akira Mizutani, Matsumoto (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 11/732,113

(22) Filed: Apr. 2, 2007

(65) Prior Publication Data

US 2007/0242118 A1    Oct. 18, 2007

(30) Foreign Application Priority Data

Apr. 3, 2006   (JP) .............................. 2006-101811
Mar. 14, 2007  (JP) .............................. 2007-065550

(51) Int. Cl.
C09D 11/02   (2006.01)
B41J 2/01    (2006.01)

(52) U.S. Cl. ................ 106/31.6; 106/31.68; 106/31.78; 106/31.86; 106/31.89; 106/31.9; 347/100

(58) Field of Classification Search ................ 106/31.6, 106/31.9, 31.86, 31.68, 31.78, 31.89; 347/100
See application file for complete search history.

(56) References Cited

U.S. PATENT DOCUMENTS

| 6,419,733 | B1 * | 7/2002 | Sano et al. ................ 106/31.86 |
| 6,843,840 | B2 * | 1/2005 | Kataoka et al. ............ 106/31.6 |
| 2003/0116055 | A1 * | 6/2003 | Kubota et al. .............. 106/31.6 |
| 2005/0203210 | A1 * | 9/2005 | Kataoka et al. ............. 523/160 |
| 2005/0284330 | A1 * | 12/2005 | Jackson ...................... 106/31.6 |
| 2007/0002109 | A1 * | 1/2007 | Sato et al. .................. 106/31.6 |
| 2007/0266887 | A1 * | 11/2007 | Koganehira et al. ........ 106/31.6 |

FOREIGN PATENT DOCUMENTS

| JP | 10-103760 | 4/1998 |
| JP | 10/123760 | 5/1998 |
| WO | 99/05230 | 2/1999 |
| WO | 02/010059 | 12/2002 |
| WO | 2006/004001 | 1/2006 |
| WO | WO 2006/004001 | * 1/2006 |

OTHER PUBLICATIONS

Esp@cenet Abstract of JP 10/123760 dated May 15, 1998.
Patent Abstracts of Japan of JP 10-103760 dated Apr. 21, 1998.

* cited by examiner

*Primary Examiner*—Helene Klemanski
(74) *Attorney, Agent, or Firm*—Ladas & Parry LLP (57) ABSTRACT

An ink set, provided with at least a magenta ink composition, a yellow ink composition and a cyan ink composition, wherein the magenta ink composition has an L* value of 60 or more and a b* value of −17 or less when the CIE standard a* value as calculated from the visible absorption spectrum in an aqueous solution diluted 10,000-fold or less is 80.

63 Claims, 4 Drawing Sheets

Position [° 2 Thata]

■ COMPARATIVE EXAMPLE 1
⋯⋯ EXAMPLE 2

FIG. 4

INK SET, RECORDING METHOD AND RECORDED ARTICLE

BACKGROUND

1. Technical Field

The present invention relates to an ink set, a recording method and a recorded article, and more particularly, to an ink set capable of realizing both improved color reproducibility and gloss when recording on a recording medium, a recording method and a recorded article.

2. Related Art

In the past, three-color ink sets provided with yellow (Y), magenta (M) and cyan (C) ink compositions, and four-color ink sets in which a black (K) ink composition is further added, have been supplied as ink sets for color ink jet recording.

In addition, ink sets provided with red (R) and/or violet (V) ink compositions in addition to the YMC ink have been proposed to enhance color reproducibility of the resulting recorded articles (see, for example, International Publication WO 02/100959).

In addition, ink sets have also been proposed provided with two colors of orange (Or) and green (Gr) special-color ink compositions in addition to the YMC ink (see, for example, International Publication WO 99/005230).

However, although gloss is superior in the case of recording using the ink set of International Publication WO 02/100959, further suppression of interference color (bronzing) is desired.

In addition, since the pigment solid component is 3% by weight or more in the case of recording using the ink set of International Publication WO 99/005230, further improvement of gloss is desired on printing paper-based glossy media (for example, Photo Paper <Gloss> (Product No. KA420PSK) (Seiko Epson Corp.)).

In the case of previous ink sets, contrast of human skin color was not adequately realized in recorded samples. Namely, previous ink sets had problems such as deterioration of granularity during color reproduction of dark areas of human skin color, the occurrence of false contours, the occurrence of a phenomenon in which dark areas of human skin color become greenish (green transfer) as a result of local superposition of C ink dots and Y ink dots recorded for color reproduction, and increased appearance of rainbow colors (prismatic light) resulting from mixing of the green of superimposed dots and the red of interference color at dark areas of human skin color due to the occurrence of reddish interference color when the concentration of the pigment solid component of the C ink is 3% by weight or less. These problems are particularly prominent in portraits of infants photographed with improper exposure and so on.

Therefore, an advantage of some aspects of the invention is to provide an ink set capable of realizing both improved color reproducibility and gloss when recording on a recording medium.

SUMMARY

As a result of conducting extensive studies, the inventors of the present invention found that an ink set provided with a specific YMC ink, a specific ink (A) and a specific ink (B) is able to realize both improved color reproducibility and gloss during recording, thereby leading to completion of the present invention.

Namely, the present invention provides the following inventions of (1) to (33):

(1) an ink set provided with at least a magenta ink composition, a yellow ink composition and a cyan ink composition; wherein the magenta ink composition has an $L^*$ value of 60 or more and a $b^*$ value of $-17$ or less when the CIE standard $a^*$ value as calculated from the visible absorption spectrum in an aqueous solution diluted 10,000-fold or less is 80;

(2) the ink set described in (1) above, wherein the magenta ink composition has a CIE standard $L^*$ value of 96 or more and $a^*$ value of 7.5 or more as calculated from the visible absorption spectrum in an aqueous solution having a pigment solid component concentration of $2\times10^{-3}$ g/l;

(3) the ink set described in (1) above, wherein the magenta ink composition has an $a^*$ value of 11.5 or more and a $b^*$ value of $-5.5$ or less when the CIE standard $L^*$ value as calculated from the visible absorption spectrum in an aqueous solution diluted 10,000-fold or more is 94;

(4) the ink set described in any of (1) to (3) above, wherein the magenta ink composition at least contains a solid solution of γ-type C.I. pigment violet 19 and C.I. pigment red 202;

(5) the ink set as described in any of (1) to (4) above, wherein the colorant of the yellow ink composition is one or more types selected from the group consisting of C.I. pigment yellow 74, 128, 129, 151, 153, 155, 174, 180, 188 and 198;

(6) the ink set described in any of (1) to (5) above, wherein the colorant of the cyan ink composition is selected from one or more types selected from the group consisting of C.I. pigment blue 15:1, 15:2, 15:3, 15:4 and 16 and C.I. vat blue 4 and 60;

(7) the ink set described in any of (1) to (6) above, wherein the ink set is further provided with an orange ink composition;

(8) the ink set described in (7) above, wherein the colorant of the orange ink composition is a pigment of C.I. pigment orange 43 and/or 36;

(9) the ink set described in (7) above, wherein the colorant of the orange ink composition is a pigment of C.I. pigment 43 and/or 242;

(10) the ink set described in (7) above, wherein the mixing ratio of the colorants of the orange ink composition is such that the ratio of C.I. pigment orange 43 to C.I. pigment red 242 is 4:1 to 2:1;

(11) the ink set described in any of (1) to (10) above, wherein the ink set is further provided with a green ink composition;

(12) the ink set described in (11) above, wherein the colorant of the green ink composition is a pigment of C.I. pigment green 7 and/or 36;

(13) the ink set described in any of (1) to (12), wherein the ink set is further provided with a black ink composition;

(14) the ink set described in (13) above, wherein the colorant of the black ink composition comprises C.I. pigment black 7 and one or more types selected from the group consisting of C.I. pigment blue 15:1, 15:2, 15:3, 15:4 and 16 and C.I. vat blue 4 and 60;

(15) the ink set described in any of (1) to (14) above, wherein the pigment solid component concentration of each ink composition is 3% by weight or more;

(16) the ink set described in any of (1) to (14) above, wherein the ink set is provided with ink compositions in which the colors are mutually the same but the pigment solid component concentrations are different;

(17) the ink set as described in (16) above, wherein the ink set is provided with at least an ink composition in which the pigment solid component concentration of each ink composition is 2.5% by weight or less, and an ink composition in which the pigment solid component concentration of each ink composition is greater than 2.5% by weight;

(18) the ink set described in (16) above, containing at least a black ink composition in which the pigment solid component concentration is less than 1% by weight, and a black ink composition in which the pigment solid component concentration is 1 to 3% by weight;

(19) the ink set described in any of (1) to (18) above, wherein one or more types of the magenta ink composition, the yellow ink composition and the cyan ink composition contain a white pigment;

(20) the ink set as described in (19) above, wherein the white pigment is titanium dioxide or zirconia dioxide;

(21) the ink set described in any of (1) to (20) above, wherein each ink composition contains one or more types of a wetting agent in the form of a polyvalent alcohol, a sugar or a polyvalent alcohol having an ethylene oxide chain;

(22) the ink set described in any of (1) to (21) above, wherein each ink composition contains one or more types of a penetrating agent in the form of a pyrrolidone, an alkanediol or a glycol ether;

(23) the ink set described in any of (1) to (22) above, wherein each ink composition contains one or more types of a surfactant in the form of an acetylene glycol or a polysiloxane;

(24) the ink set described in (23) above, wherein the polysiloxane is a polyorganosiloxane represented by the following general formula:

(wherein, R represents a hydrogen atom or a methyl group, a represents an integer of 7 to 11, m represents an integer of 20 to 70, and n represents an integer of 2 to 5);

(25) the ink set described in (23) or (24) above, wherein the polysiloxane further includes a polyorganosiloxane represented by the following general formula:

(wherein, R represents a hydrogen atom or a methyl group, a represents an integer of 2 to 13, m represents an integer of 2 to 4, and n represents an integer of 1 to 2);

(26) the ink set described in any of (1) to (25), wherein each ink composition contains an alkanediol;

(27) the ink set described in (26) above, wherein the alkanediol is a branched 1,2-alkanediol;

(28) the ink set described in any of (1) to (27) above, wherein each ink composition contains a polyorganosiloxane;

(29) the ink set described in any of (1) to (28) above, wherein the surface tension of each ink composition is 25 mN/m or less;

(30) the ink set described in any of (1) to (29) above, which is used for ink jet recording;

(31) a recording method for adhering an ink composition and printing onto a recording medium; wherein an ink composition constituting the ink set described in any of (1) to (29) above is used for the ink composition;

(32) an ink jet recording method for printing by discharging droplets of an ink composition and adhering the droplets to a recording medium; wherein an ink composition constituting the ink set described in any of (1) to (29) above is used for the ink composition; and, (33) a recorded article printed according to the recording method as described in (31) or (32) above.

DESCRIPTION OF EXEMPLARY EMBODIMENTS

The following provides an explanation of embodiments of the present invention. The following embodiments are examples for explaining the present invention, and are not intended to limit the present invention to these embodiments only. The present invention can be carried out in various forms provided they do not deviate from the gist thereof.

Ink Set

As previously described, the ink set of the present embodiment is provided with at least a magenta ink composition, a yellow ink composition and a cyan ink composition; wherein the magenta ink composition has an L* value of 60 or more and a b* value of −17 or less when the CIE standard a* value as calculated from the visible absorption spectrum in an aqueous solution diluted 10,000-fold or less is 80.

As a result of composing the magenta ink composition used in the ink set of the present invention in the manner described above, an ink set is provided having superior color development, granularity and gloss when recorded, is resistant to the occurrence of clogging in an ink jet recording head, and has superior color reproducibility of high saturation and high brightness red areas and superior color reproducibility of violet areas.

The magenta ink composition has superior color reproducibility in areas of high saturation and high brightness even if the pigment concentration is comparatively low due to the satisfactory color development thereof. Since color reproducibility is superior even if the pigment concentration is comparatively low, increases in viscosity of the ink caused by increasing the pigment concentration can be prevented.

In addition, the magenta ink composition demonstrates remarkable improvement of color development on ordinary paper in the case of having increased pigment concentration.

Moreover, the magenta ink composition also has superior gas fastness, light resistance and resistance to metamerism.

The magenta ink composition preferably has a CIE standard L* value of 96 or more and a* value of 7.5 or more as calculated from the visible absorption spectrum in an aqueous solution having a pigment concentration of $2 \times 10^{-3}$ g/l. As a result of employing this preferable composition, an ink set is provided having more remarkably superior granularity and color development.

The magenta ink composition preferably has an a* value of 11.5 or more and a b* value of −5.5 or less when the CIE standard L* value as calculated from the visible absorption spectrum in an aqueous solution diluted 10,000-fold or more is 94. As a result of employing this preferable composition, an ink set is provided having more remarkably superior granularity, gloss, resistance to metamerism, gas fastness and light resistance.

The magenta ink composition preferably at least contains a solid solution of γ-type C.I. pigment violet 19 and C.I. pigment red 202. As a result of employing this preferable composition, the effects described above can be further improved.

Here, the "solid solution of γ-type C.I. pigment violet 19 and C.I. pigment red 202" refers to a liquid crystal in a state in which γ-type PV19 and PR202 are mutually dissolved in a solid.

Although the weight ratio of the solid solution of γ-type PV19 and PR202 can be suitably adjusted within the scope of the present invention, the weight of γ-type PV19 is preferably greater than the weight of PR202.

Figure 1:
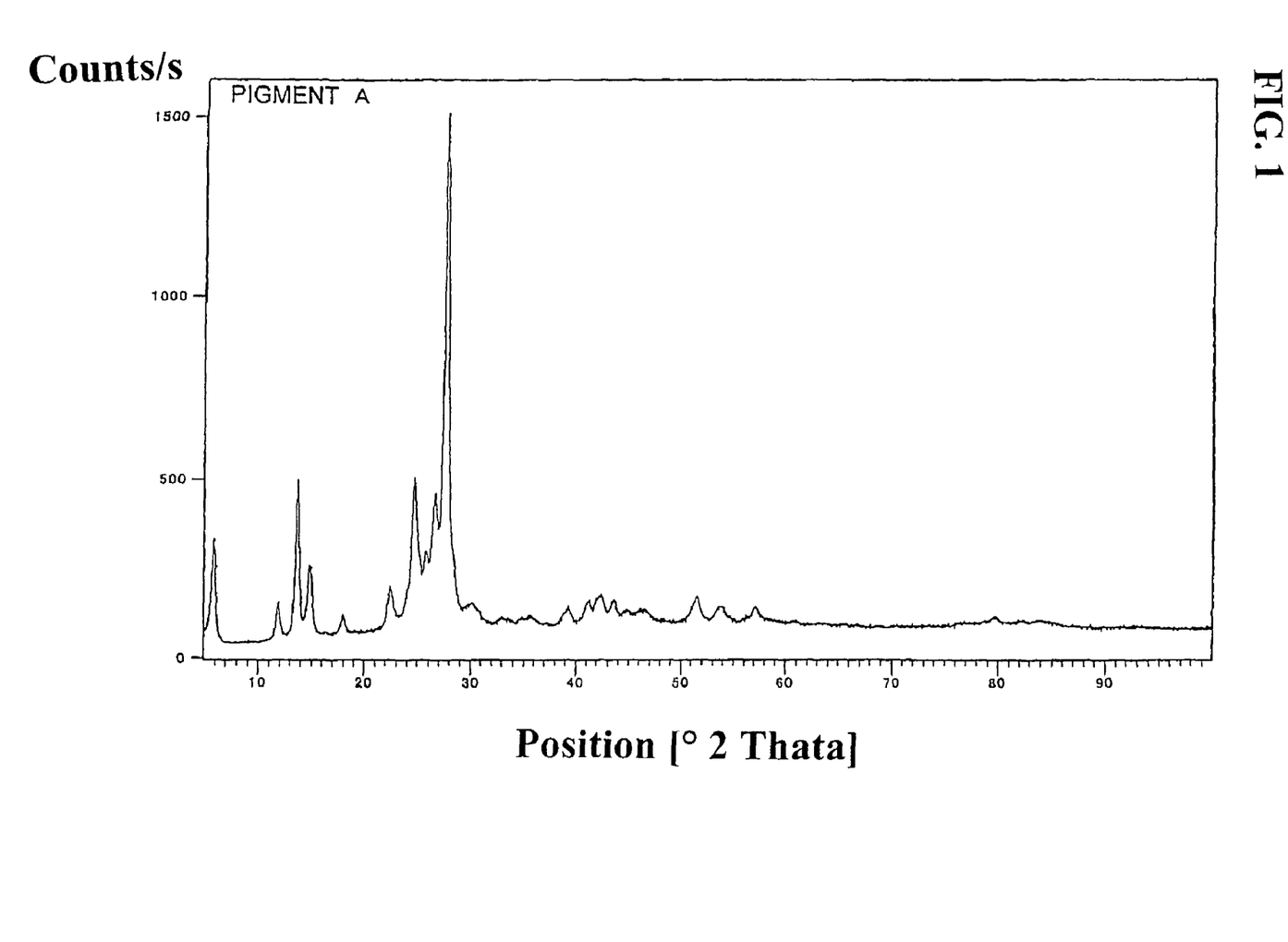
FIG. 1 is a graph showing the results of an X-ray powder diffraction analysis of a preferable example of a solid solution contained in a magenta ink.

The results of X-ray powder diffraction analysis of a preferable example of the solid solution are shown in FIG. 1. In this analysis, samples were measured after packing into a glass cell having a thickness of 0.5 mm using PaNalytical X'PertPro.

The magenta ink composition may also further contain other magenta pigments such as PV19 or PV32 in addition to the solid solution. Examples of other magenta pigments include C.I. pigment red (PR) 5, 7, 12, 48 (Ca), 48 (Mn), 57 (Ca), 57:1, 112, 122, 123, 168, 184, 202 and 209 and C.I. pigment violet 19 (PV19).

The ink set of the present embodiment is provided with a magenta ink composition at least containing the solid solution, and as long as it contains the solid solution, may also contain other magenta pigments such as PV19 or PV32 or other pigments. In addition, the weight ratio of the γ-type PV19 and PR202 in the solid solution can be suitably adjusted within the scope of the present invention.

In the present embodiment, the CIE standard L* value, a* value and b* value as calculated from the visible absorption spectrum can be obtained by measuring transmittance using, for example, the U3300 manufactured by Hitachi Ltd. under conditions of a scanning speed of 600 nm/min, measuring wavelength range of 380 to 800 nm and slit width of 2.0 nm, and then calculating with a D65 light source at a view angle of 2 degrees.

The yellow ink composition used in the ink set of the present embodiment preferably contains a complex pigment. The pigment contained in the yellow ink composition is preferably one or more types of pigment selected from the group consisting of C.I. pigment yellow 74, 128, 129, 151, 153, 155, 174, 180, 188 and 198.

The cyan ink composition used in the ink set of the present embodiment preferably contains a complex pigment. The pigment contained in the cyan ink composition is preferably one or more types of pigment selected from the group consisting of C.I. pigment blue 15:1, 15:2, 15:3, 15:4 and 16 and C.I. vat blue 4 and 60.

The ink set of the present embodiment is preferably further provided with an orange ink composition and/or a green ink composition.

Although an ink set composed of a yellow ink composition, a magenta ink composition and a cyan ink composition is typically used in color ink jet recording methods, combining an orange ink composition and/or green ink composition for use in the ink set of the present embodiment makes it possible to enjoy the advantages indicated below.

First, according to the ink set provided with an orange ink composition and/or a green ink composition, the range of color reproducibility of color images can be expanded, and in particular, the color reproducibility of red-based and green-based colors can be improved. Although the red and green saturations of images obtained by ordinary color ink jet recording methods of the past were about 60 and 70, respectively, if a combination of an orange ink composition and/or a green ink composition is used in the ink set of the present embodiment, saturation in excess of 70 can be realized, and in the case of a preferable aspect thereof, saturation of 80 or more can be realized.

In addition, if a combination of an orange ink composition and/or a green ink composition is used in the ink set of the present embodiment, the advantage is obtained of being able to express more subtle intermediate colors. In ink jet recording methods, color images are represented by binary control consisting of controlling whether an ink composition is printed or not. Thus, the number of colors that can be represented is limited by the resolution. According to the ink set of the present embodiment, the addition of an orange ink composition and/or a green ink composition makes it possible to increase the degree of freedom of intermediate color representation, thereby making it possible to considerably increase the number of colors that can be represented.

In addition, according to the ink set of the present embodiment, printed articles having satisfactory saturation and brightness can be obtained, and even in cases of using a pigment for the colorant in particular, printed articles having satisfactory brightness and saturation can be obtained. When two or more colors of ink compositions are printed simultaneously in color printing, the brightness of the printed surface decreases or saturation tends to decrease. This trend is more prominent in ink compositions using pigment for the colorant than in ink compositions using dye for the colorant. However, if a combination of an orange ink composition and/or a green ink composition is used in the ink set of the present embodiment, images can be obtained that are not inferior in terms of saturation or brightness to the case of using each ink composition alone.

According to a preferable aspect of the present embodiment, the orange pigment is C.I. pigment orange 43 and/or C.I. pigment orange 36, or C.I. pigment orange 43 and/or C.I. pigment orange 242.

In addition, in the case the orange pigment is C.I. pigment orange 43 and/or C.I. pigment orange 242, the weight ratio of C.I. pigment orange 43 to C.I. pigment orange 242 is preferably 4:1 to 2:1 from the viewpoint of obtaining high color reproducibility and gloss.

In addition, according to preferable aspect of the present embodiment, the green pigment is C.I. pigment green 7 and/or C.I. pigment green 36.

The ink set of the present embodiment is preferably further provided with a black ink composition. The colorant of the black ink composition is preferably comprised of C.I. pigment black 7 and one or more types selected from the group consisting of C.I. pigment blue 15:1, 15:2, 15:3, 15:4 and 16 and C.I. vat blue 4 and 60. As a result of using this mixed pigment for the colorant of the black ink composition, the effect is obtained of being able to suppress reddening of hue at areas of low duty.

The pigment solid component concentration of each ink composition used in the ink set of the present embodiment is preferably 3% by weight or more from the viewpoint of ensuring color reproducibility in recorded images.

Moreover, the ink set of the present embodiment is more preferably provided with ink compositions in which the colors are mutually the same but the pigment solid component concentrations are different. Here, "ink compositions in which the colors are mutually the same but the pigment solid component concentrations are different" refer to ink compositions that mutually use the same type of pigment, but the solid component concentrations (weight ratios) are different.

For example, the ink set of the present embodiment can at least be provided with ink compositions using the same type of pigment consisting of an ink composition in which the pigment solid component concentration is 2.5% by weight or less, and an ink composition in which the pigment solid component concentration is greater than 2.5% by weight.

As a result of providing two or more types of ink compositions having different pigment solid component concentrations, fixability of the ink when recorded into a recording medium is satisfactory, and a recorded article can be obtained having improved gloss variations and gloss. Namely, extremely satisfactory image quality having improved gloss variations, gloss and fixability can be realized by combining the respective properties of dark ink compositions having a high pigment solid component concentration and light ink compositions having a low pigment solid component concentration.

Furthermore, the black ink composition preferably contains a black ink composition in which the pigment solid component concentration is less than 1% by weight and a black ink composition in which the pigment solid component concentration is 1 to 3% by weight from the viewpoint of granularity.

In addition, among the ink compositions used in the ink set of the present embodiment, one or more types of the magenta ink composition, the yellow ink composition and the cyan ink composition preferably contains a white pigment.

As a result of one type of two or more types of the magenta ink composition, the yellow ink composition and the cyan ink composition containing a white pigment, ink compositions can be obtained that are able to suppress bronzing without impairing the gloss of recorded articles.

Examples of the white pigment include oxides of elements of group IV of the periodic table, such as titanium dioxide and zirconia dioxide.

The primary particle diameter of the white pigment is preferably 1 µm or less, more preferably 200 nm or less and even more preferably 120 nm or less from the viewpoint of the gloss of printed articles and the effect of suppressing bronzing.

Here, "primary particle diameter" refers to the size of particles formed as a result of aggregation of single crystals or crystallites similar thereto. Pigment primary particle diameter is measured by microscopic observation. This consists of measuring the size of pigment particles from electron micrographs, and more reliable values can be determined by dispersing the pigment in an organic solvent, immobilizing on a support film, processing images from scanning electron micrographs, and measuring the particle diameter. More specifically, the short axis diameter and long axis diameter of individual primary particles are measured, the diameter of a circle equal in surface area to the particle at that time is determined arithmetically, that diameter is defined as the primary particle diameter, 50 or more pigment particles are then randomly selected from a single field, and the average value thereof is determined. Although other measurement methods may be used provided they allow the obtaining of equal reliability, values determined according to the method described above are used in cases in which there are substantial differences in values.

The content of the white pigment as the amount of solid is preferably 0.01% by weight or more, more preferably 0.1% by weight or more and even more preferably 0.1 to 5% by weight based on the weight of the ink compositions (100% by weight) from the viewpoint of printed article gloss and bronzing suppression effects.

In addition to using a pigment for the colorant, the ink compositions used in the ink set of the present embodiment also preferably contain a dispersant for dispersing the pigment. There are no particular limitations on the dispersant provided it is that which can be used in this type of pigment ink, and examples include cationic dispersants, anionic dispersants, nonionic dispersants and surfactants.

Examples of anionic dispersants include polyacrylic acid, polymethacrylic acid, acrylic acid-acrylonitrile copolymers, vinyl acetate-acrylic acid ester copolymers, acrylic acid-acrylic acid alkyl ester copolymers, styrene-acrylic acid copolymers, styrene-methacrylic acid copolymers, styrene-acrylic acid-acrylic acid alkyl ester copolymers, styrene-methacrylic acid-acrylic acid alkyl ester copolymers, styrene-α-methyl styrene-acrylic acid copolymers, styrene-α-methyl styrene-acrylic acid-acrylic acid alkyl ester copolymers, styrene-maleic acid copolymers, vinylnapthalene-maleic acid copolymers, vinyl acetate-ethylene copolymers, vinyl acetate-fatty acid vinyl ethylene copolymers, vinyl acetate-maleic acid ester copolymers, vinyl acetate-crotonic acid copolymers and vinyl acetate-acrylic acid copolymers.

Examples of nonionic dispersants include polyvinyl pyrrolidone, polypropylene glycol and vinyl pyrrolidone-vinyl acetate copolymers.

Examples of dispersants in the form surfactants include anionic surfactants such as sodium dodecylbenzene sulfonate, sodium laurate and ammonium salts of polyoxyethylene alkyl ether sulfates, and nonionic surfactants such as polyoxyethylene alkyl ethers, polyoxyethylene alkyl esters, polyoxyethylene sorbitan fatty acid esters, polyoxyethylene alkyl phenyl ethers, polyoxyethylene alkyl amines and polyoxyethylene alkyl amides. Styrene-(meth)acrylic acid copolymers are used particularly preferably from the viewpoint of enhancing dispersion stability of the pigment.

In addition, the ink compositions used in the ink set of the present embodiment preferably contain one or more types of polyvalent alcohols, sugars or polyvalent alcohols having an ethylene oxide chain as a wetting agent. As a result of adding such a wetting agent, drying of the ink is prevented and clogging of the head of an ink jet printer is suppressed in the case of using for ink jet recording.

Examples of wetting agents include polyvalent alcohols such as ethylene glycol, diethylene glycol, triethylene glycol, polyethylene glycol, polypropylene glycol, propylene glycol, butylene glycol, 1,2,6-hexanetriol, thioglycol, hexylene glycol, glycerin, trimethylol ethane or trimethylol propane; sugars such as sugar alcohols; and polyvalent alcohols having an ethylene oxide chain such as ethylene glycol monoethyl ether, ethylene glycol monobutyl ether, diethylene glycol monomethyl ether, diethylene glycol monoethyl ether, diethylene glycol monobutyl ether, triethylene glycol monomethyl ether, triethylene glycol monoethyl ether or triethylene glycol monobutyl ether, and one or more types of these wetting agents are used.

The ink compositions used in the ink set of the present embodiment preferably contain one or more types of lactones, lactams (pyrrolidones), alkanediols or glycol ethers as a penetrating agent. As a result of adding a penetrating agent, the wettability to the recording medium can be enhanced and the penetrability of the ink can be improved.

Examples of penetrating agents include lactones such as γ-butyrolactone; lactams (pyrrolidones) such as 2-pyrrolidone or N-methyl-2-pyrrolidone; alkanediols such as 1,2-pentanediol or 1,2-hexanediol; and glycol ethers such as ethylene glycol monomethyl ether, diethylene glycol monoethyl ether, diethylene glycol monobutyl ether, triethylene glycol monobutyl ether, propylene glycol monobutyl ether or dipropylene glycol monobutyl ether, and one or more types of these penetrating agents are preferably contained.

The ink compositions used in the ink set of the present embodiment preferably contain one or more types of a surfactant in the form of an acetylene glycol or polysiloxane. As a result of adding a surfactant, wettability to the recording medium can be enhanced and ink penetrability can be improved.

Each ink composition preferably contains a polyorganosiloxane represented by the following general formula as a polysiloxane able to be used as a surfactant:

(wherein, R represents a hydrogen atom or a methyl group, a represents an integer of 7 to 11, m represents an integer of 20 to 70, and n represents an integer of 2 to 5).

As a result of employing such a preferable composition, a recorded article can be obtained having further improved gloss.

Alternatively, each ink composition preferably contains a surfactant in the form of a polyorganosiloxane represented by the following general formula in addition to the polyorganosiloxane represented by the general formula indicated above:

(wherein, R represents a hydrogen atom or a methyl group, a represents an integer of 2 to 13, m represents an integer of 2 to 4, and n represents an integer of 1 to 2).

As a result of employing such a preferable composition, uneven aggregation when recording onto printing proof paper can be suppressed.

A plurality of types of polysiloxanes may be used in the ink compositions. In addition, adjusting the surface tension of the ink compositions to 25 mN/m or less is preferably from the viewpoint of aggregated dots, while the added amount of polysiloxane is preferably 0.05 to 3.00% by weight from the previously mentioned viewpoint as well as the viewpoint of rapid drying of a recorded article.

Polyorganosiloxanes represented by the general formulas indicated above are available commercially, and these commercially available polyorganosiloxanes can be used. Examples of these commercially available polyorganosiloxanes that can be used include silicon-based surfactants BYK-UV3500, BYK-345, BYK-346, BYK-347 and BYK-348 commercially available from Bic Chemi Japan, Ltd.

The ink compositions used in the ink set of the present embodiment preferably contains an alkanediol from the viewpoints of water retention (moisture retention) and controlling permeability of the ink compositions into recording media such as ordinary paper.

In particular, the ink compositions preferably contain 8 to 15% by weight of a water-soluble 1,2-alkanediol. Alternatively, the ink compositions preferably contain 3 to 8% by weight of an alkanediol having water-soluble terminals. More specifically, 4-methyl-1,2-pentanediol, 1,2-pentanediol, 3,3-dimethyl-1,2-butanediol, 4,4-dimethyl-1,2-pentanediol, 5-methyl-1,2-hexanediol, 1,2-hexanediol, 1,2-heptanediol and 1,2-octanediol are preferable, while 4-methyl-1,2-pentanediol and 1,2-hexanediol are more preferable. Branched 1,2-alkanediols having 6 carbon atoms are particularly preferable.

Each ink used in the ink set of the present embodiment may also contain a low boiling point organic solvent from the viewpoint of shortening ink drying time. Examples of these low boiling point organic solvents include methanol, ethanol, n-propyl alcohol, isopropyl alcohol, n-butanol, sec-butanol, tert-butanol, isobutanol and n-pentanol, and one or more types are used. Monovalent alcohols are particularly preferable.

The ink compositions used in the ink set of the present embodiment preferably contain a component such as any of the pigments, dispersants, wetting agents, low boiling point organic solvents, penetrating agents and surfactants previously described, while also containing water for the balance thereof. Pure water of ultrapure water such as ion exchange water, ultrafiltered water, reverse osmosis water or distilled water is preferably used for the water. In particular, water obtained by sterilizing this water by ultraviolet irradiation or addition of hydrogen peroxide and the like is preferable since mold and bacteria growth are prevented over a long period of time.

Each ink composition can contain additives including fixing agents such as a water-soluble rosin, anti-mold agents or antiseptics such as sodium benzoate, antioxidants or ultraviolet absorbers such as alohanates, chelating agents, oxygen absorbers and pH adjusters as necessary, and one or more types are used.

Examples of pH adjusters include potassium hydroxide, sodium hydroxide, triethanolamine and tripropanolamine. The amount of pH adjuster added is determined according to the target pH.

Recording Method

The recording method in the present embodiment is a recording method that uses the ink set described above. Examples of recording methods that use an ink set include an ink jet recording method and other types of printing methods. Thus, the ink set as claimed in the above embodiment can be preferably used in applications such as an ink jet recording method.

According to another aspect of the recording method of the present embodiment, an ink jet recording method is provided in which droplets of the ink compositions provided in the ink set of the previous embodiment are discharged from a nozzle and adhered to a recording medium. Any method can be used for the ink jet recording method according to the present embodiment provided it is a method in which the ink compositions provided in the ink set are discharged from narrow nozzles in the form of liquid droplets and those liquid droplets are adhered to a recording medium. Various types of methods are known as specific examples of such a method.

An electrostatic attraction method is one example of such a method. In this method, a strong electric field is applied between a nozzle and acceleration electrodes placed in front of the nozzle, ink in the form of droplets is sprayed continuously from the nozzle, and a printing information signal is applied to deflection electrodes and recorded during the time the ink droplets are propelled between the deflection electrodes. In addition, in this method, the ink droplets may be sprayed corresponding to the printing information signal without being deflected as necessary.

Another method involves applying pressure to the ink droplets with a small pump and forcibly spraying the ink droplets by mechanically oscillating the nozzle with a crystal unit and the like. In this method, the sprayed ink droplets are charged simultaneous to being sprayed, and a printing information signal is applied to deflection electrodes and recorded during the time the ink droplets are propelled between the deflection electrodes. An example of another aspect is a method that uses a piezoelectric device. In this method, recording is carried out by applying pressure to the ink droplets with a piezoelectric device simultaneous to the application of a printing information signal followed by spraying the ink droplets. An example of still another aspect is a method in which ink droplets are made to rapidly swell in volume due to the action of thermal energy. In this method, recording is carried out by heating and foaming the ink droplets with microelectrodes according to a printing information signal followed by spraying the ink droplets.

There are no particular limitations on the recording medium and various recording media can be used, examples of which include ordinary paper, dedicated ink jet paper, plastic, film and metal.

Recorded Article

Moreover, according to the present embodiment, a recorded article is provided that has been recorded according to the recording method as claimed in the previous embodiment. This recorded article is recorded by discharging liquid droplets of at least the ink compositions provided in the previously described ink set and adhering the liquid droplets to a recording medium. Since a recorded article recorded according to the recording method as claimed in the previous embodiment is a recorded article that was recorded using the previously described ink set, both color reproducibility and gloss can be achieved when recording onto a recording medium. Furthermore, the recording medium described above can be used as a specific example of the recording medium.

Although the following provides a more detailed explanation of the present invention through examples thereof, the present invention is not limited to these examples. A person with ordinary skill in the art is able to carry out the following examples as well as adding various alterations thereto, and these variations are also included within the scope of the present invention.

EXAMPLE 1

A magenta ink composition, yellow ink composition, cyan ink composition, light magenta ink composition, light cyan ink composition and black ink composition were respectively prepared according to the compositions indicated below to obtain an ink set.

In the present example, a solid solution of γ-type C.I. pigment violet (PV) 19 and C.I. pigment red (PR) 202 was used as the pigment of the magenta ink composition.

Here, the $L^*$, $a^*$ and $b^*$ values of the magenta ink composition were measured. Namely, transmittance was measured for the CIE standard $L^*$ value, $a^*$ value and $b^*$ value as calculated from the visible absorption spectrum of the magenta ink composition using, for example, the U3300 manufactured by Hitachi Ltd. under conditions of a scanning speed of 600 nm/min, measuring wavelength range of 380 to 800 nm and slit width of 2.0 nm, followed by calculating with a D65 light source at a view angle of 2 degrees.

As a result, the $L^*$ value was 65 and the $b^*$ value was −27 when the CIE standard $a^*$ value as calculated from the visible absorption spectrum in an aqueous solution diluted 10,000-fold or less was 80.

In addition, the CIE standard $L^*$ value of the magenta ink composition as calculated from the visible absorption spectrum in an aqueous solution having a pigment solid component concentration of $2\times10^{-3}$ g/l was 96.5.

Moreover, the $a^*$ value of the magenta ink composition was −13 and the $b^*$ value was −6 when the CIE standard $L^*$ value as calculated from the visible absorption spectrum in an aqueous solution diluted 10,000-fold or more was 94.

Magenta Ink Composition
Glycerin
10.0 wt %
4-methyl-1,2-pentanediol
8.0 wt %
Triethanolamine
0.9 wt %
BYK-UV3510 (Bic Chemi Japan, Ltd.)
0.1 wt %
Solid solution of PV19 and PR202
5.0 wt %
Styrene-acrylic acid copolymer resin
2.0 wt %
Pure water
Balance
Total
100.0 wt %
Yellow Ink Composition
Glycerin
10.0 wt %
4-methyl-1,2-pentanediol
8.0 wt %
Triethanolamine
0.9 wt %
BYK-UV3510 (Bic Chemi Japan, Ltd.)
0.1 wt %
PY74
5.0 wt %
Styrene-acrylic acid copolymer resin
2.0 wt %
Pure water
Balance
Total
100.0 wt %
Cyan Ink Composition
Glycerin
10.0 wt %
4-methyl-1,2-pentanediol
8.0 wt %
Triethanolamine 0.9 wt %
BYK-UV3510 (Bic Chemi Japan, Ltd.)
0.1 wt %
PB15:4
4.0 wt %
Styrene-acrylic acid copolymer resin
1.6 wt %
Pure water
Balance
Total
100.0 wt %
Light Magenta Ink Composition
Glycerin
10.0 wt %
4-methyl-1,2-pentanediol
8.0 wt %
Triethanolamine
0.9 wt %
BYK-UV3510 (Bic Chemi Japan, Ltd.)
0.1 wt %
Solid solution of PV19 and PR202
1.2 wt %
Styrene-acrylic acid copolymer resin
0.5 wt %
Pure water
Balance
Total
100.0 wt %
Light Cyan Ink Composition
Glycerin
10.0 wt %
4-methyl-1,2-pentanediol
8.0 wt %
Triethanolamine
0.9 wt %
BYK-UV3510 (Bic Chemi Japan, Ltd.)
0.1 wt %
PB15:4
0.8 wt %
Styrene-acrylic acid copolymer resin
0.3 wt %
Pure water
Balance
Total
100.0 wt %
Black Ink Composition
Glycerin
10.0 wt %
4-methyl-1,2-pentanediol
8.0 wt %
Triethanolamine
0.9 wt %
BYK-UV3510 (Bic Chemi Japan, Ltd.)
0.1 wt %
PCB7
1.5 wt %
Styrene-acrylic acid copolymer resin
0.8 wt %
Pure water
Balance
Total
100.0 wt %

EXAMPLE 2

An ink set was composed in the same manner as Example 1 with the exception of adding 0.3% by weight of titanium dioxide and adding an orange ink composition having a composition indicated below to the cyan ink composition, light magenta ink composition, light cyan ink composition and black ink composition.

Orange Ink Composition
Glycerin
10.0 wt %
4-methyl-1,2-pentanediol
8.0 wt %
Triethanolamine
0.9 wt %
BYK-UV3510 (Bic Chemi Japan, Ltd.)
0.1 wt %
POr43
5.0 wt %
Styrene-acrylic acid copolymer resin
2.0 wt %
Pure water
Balance
Total
100.0 wt %

EXAMPLE 3

An ink set was composed in the same manner as Example 2 with the addition of adding a green ink shown below.

Green Ink Composition
Glycerin
10.0 wt %
4-methyl-1,2-pentanediol
8.0 wt %
Triethanolamine
0.9 wt %
BYK-UV3510 (Bic Chemi Japan, Ltd.)
0.1 wt %
PGr36
5.0 wt %
Styrene-acrylic acid copolymer resin
2.0 wt %
Pure water
Balance
Total
100.0 wt %

EXAMPLE 4

An ink set was composed by preparing ink compositions in the same manner as Example 1 with the exception of changing the 4-methyl-1,2-pentanediol in each of the ink compositions to 1,2-hexanediol.

EXAMPLE 5

An ink set was composed by preparing ink compositions in the same manner as Example 2 with the exception of changing the 4-methyl-1,2-pentanediol in each of the ink compositions to 1,2-hexanediol.

EXAMPLE 6

An ink set was composed by preparing ink compositions in the same manner as Example 3 with the exception of changing the 4-methyl-1,2-pentanediol in each of the ink compositions to 1,2-hexanediol.

EXAMPLE 7

An ink set was composed by preparing ink compositions in the same manner as Example 5 with the exception of changing the orange ink composition of Example 5 to the orange ink composition 2 shown below.

Orange Ink Composition 2
Glycerin
10.0 wt %
1,2-hexanediol
8.0 wt %
Triethanolamine
0.9 wt %
BYK-UV3510 (Bic Chemi Japan, Ltd.)
0.1 wt %
POr43
3.75 wt %
POr242
1.25 wt %
Styrene-acrylic acid copolymer resin
2.0 wt %
Pure water
Balance
Total
100.0 wt %

EXAMPLE 8

An ink set was composed by preparing ink compositions in the same manner as Example 6 with the exception of changing the orange ink composition of Example 6 to orange ink composition 2.

COMPARATIVE EXAMPLE 1

A magenta ink composition, yellow ink composition, cyan ink composition, light magenta ink composition, light cyan ink composition and black ink composition were respectively prepared according to the compositions indicated below to obtain an ink set.

In the present comparative example, C.I. pigment violet (PV) 19 was used for the magenta ink composition.

Here, the $L^*$, $a^*$ and $b^*$ values of the magenta ink composition were measured. Namely, transmittance was measured for the CIE standard $L^*$ value, $a^*$ value and $b^*$ value as calculated from the visible absorption spectrum of the magenta ink composition using, for example, the U3300 manufactured by Hitachi Ltd. under conditions of a scanning speed of 600 nm/min, measuring wavelength range of 380 to 800 nm and slit width of 2.0 nm, followed by calculating with a D65 light source at a view angle of 2 degrees.

As a result, the $L^*$ value was 61 and the $b^*$ value was $-16$ when the CIE standard $a^*$ value as calculated from the visible absorption spectrum in an aqueous solution diluted 10,000-fold or less was 80.

In addition, the CIE standard $L^*$ value of the magenta ink composition as calculated from the visible absorption spectrum in an aqueous solution having a pigment solid component concentration of $2 \times 10^{-3}$ g/l was 97 and the $a^*$ value was 5.

Moreover, the $a^*$ value of the magenta ink composition was 13 and the $b^*$ value was $-4$ when the CIE standard $L^*$ value as calculated from the visible absorption spectrum in an aqueous solution diluted 10,000-fold or more was 94.

Magenta Ink Composition
Glycerin
10.0 wt %
Triethylene glycol monobutyl ether
8.0 wt %
Triethanolamine
0.9 wt %
SF465 (Air Products Inc.)
0.1 wt %
PV19
5.0 wt %
Styrene-acrylic acid copolymer resin
2.0 wt %
Pure water
Balance
Total
100.0 wt %
Yellow Ink Composition
Glycerin
10.0 wt %
Triethylene glycol monobutyl ether
8.0 wt %
Triethanolamine
0.9 wt %
SF465 (Air Products Inc.)
0.1 wt %
PY74
5.0 wt %
Styrene-acrylic acid copolymer resin
2.0 wt %
Pure water
Balance
Total
100.0 wt %
Cyan Ink Composition
Glycerin
10.0 wt %
Triethylene glycol monobutyl ether
8.0 wt %
Triethanolamine
0.9 wt %
SF465 (Air Products Inc.)
0.1 wt %
PB15:4
4.0 wt %
Styrene-acrylic acid copolymer resin
1.6 wt %
Pure water
Balance
Total
100.0 wt %
Light Magenta Ink Composition
Glycerin
10.0 wt %
Triethylene glycol monobutyl ether
8.0 wt %
Triethanolamine
0.9 wt %
SF465 (Air Products Inc.)
0.1 wt %
PV19
1.2 wt %
Styrene-acrylic acid copolymer resin
0.5 wt %
Pure water
Balance
Total
100.0 wt %
Light Cyan Ink Composition
Glycerin 10.0 wt %
Triethylene glycol monobutyl ether
8.0 wt %
Triethanolamine
0.9 wt %
SF465 (Air Products Inc.)
0.1 wt %
PB15:4
0.8 wt %
Styrene-acrylic acid copolymer resin
0.3 wt %
Pure water
Balance
Total
100.0 wt %
Black Ink Composition
Glycerin
10.0 wt %
Triethylene glycol monobutyl ether
8.0 wt %
Triethanolamine
0.9 wt %
SF465 (Air Products Inc.)
0.1 wt %
PCB7
1.5 wt %
PB15:4
0.2 wt %
Styrene-acrylic acid copolymer resin
0.8 wt %
Pure water
Balance
Total
100.0 wt %

TEST EXAMPLE 1

Evaluation of Color Reproducibility

The ink sets of Example 1 to 6 or the ink set of Comparative Example 1 were filled into the PX-G900 Ink Jet Printer (Seiko Epson Corp.) and LUT (Look Up Table) were produced at the same ink weight limiting value. Subsequently, images enabling measurement of maximum color reproducibility were recorded on PX Proof Paper (Seiko Epson Corp.) at 14440×720 dpi to obtain recorded articles. The resulting recorded articles are shown in FIGS. 2 to 4.

Figure 2:
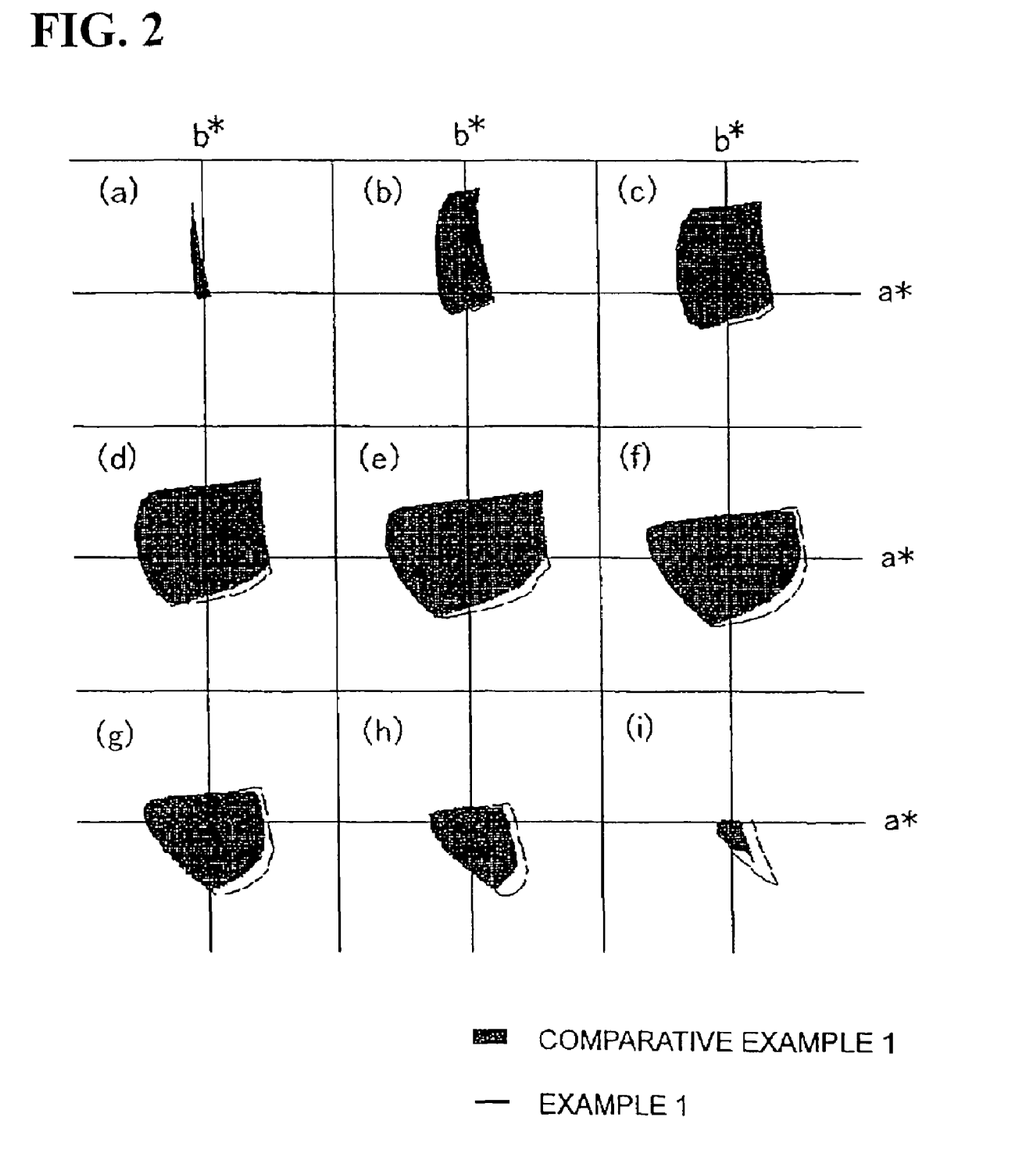
FIG. 2 is a drawing comparing color reproduction areas for patch patterns of the ink sets of Example 1 and Comparative Example 1.

FIG. 2 is a drawing comparing color reproduction areas for patch patterns of the ink sets of Example 1 and Comparative Example 1. FIG. 2A is a comparison of color reproduction areas at high brightness areas (L* value=90), FIG. 2B is a comparison of color reproduction areas at high brightness areas (L* value=80), FIG. 2C is a comparison of color reproduction areas at high brightness areas (L* value=70), FIG. 2D is a comparison of color reproduction areas at medium brightness areas (L* value=60), FIG. 2E is a comparison of color reproduction areas at medium brightness areas (L* value=50), FIG. 2F is a comparison of color reproduction areas at medium brightness areas (L* value=40), FIG. 2G is a comparison of color reproduction areas at low brightness areas (L* value=30), FIG. 2H is a comparison of color reproduction areas at low brightness areas (L* value=20), and FIG. 21 is a comparison of color reproduction areas at low brightness areas (L* value=10).

Figure 3:
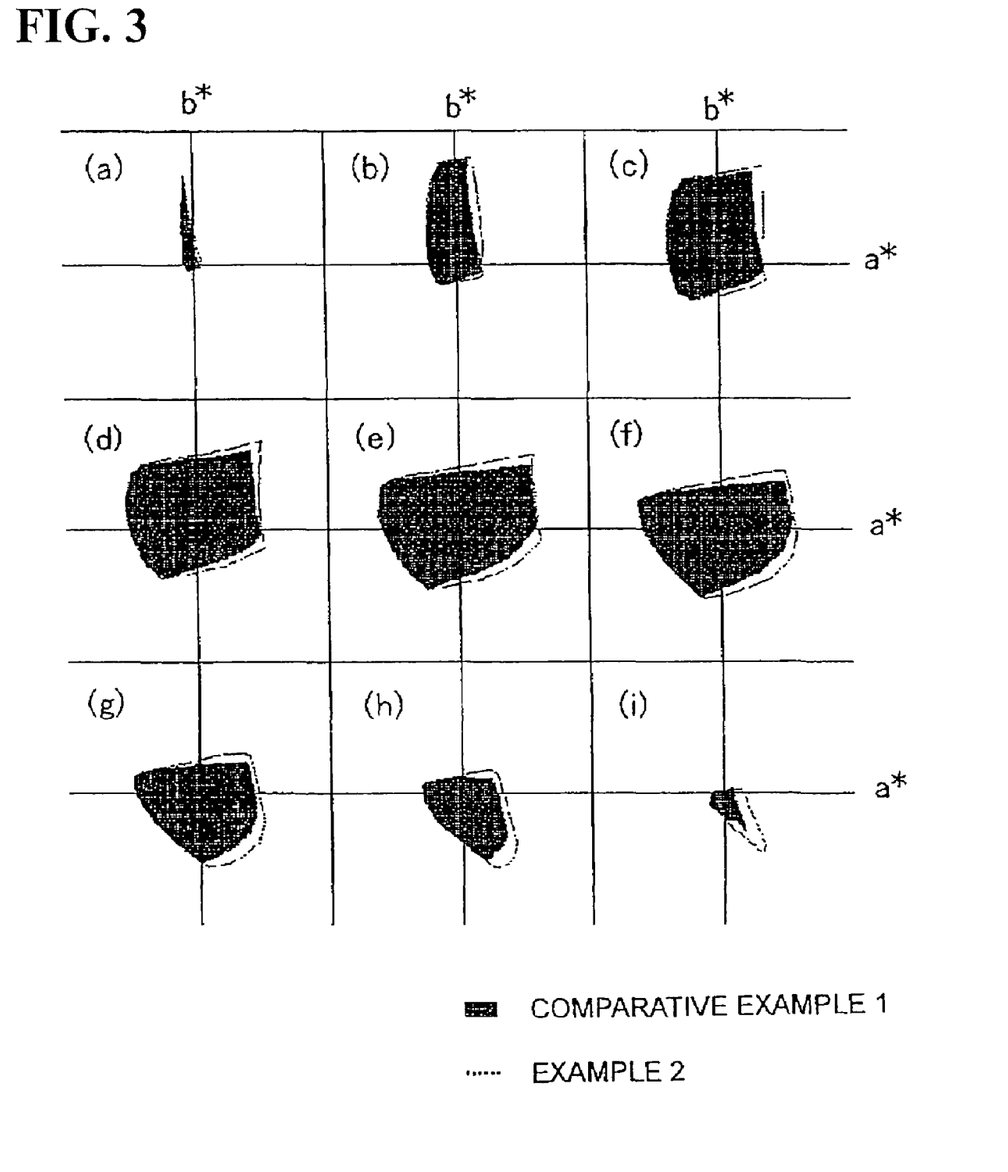
FIG. 3 is a drawing comparing color reproduction areas for patch patterns of the ink sets of Example 2 and Comparative Example 1.

FIG. 3 is a drawing comparing color reproduction areas for patch patterns of the ink sets of Example 2 and Comparative Example 1. The L* values in FIGS. 3A to 31 are the same as the L* values in FIGS. 2A to 21.

Figure 4:
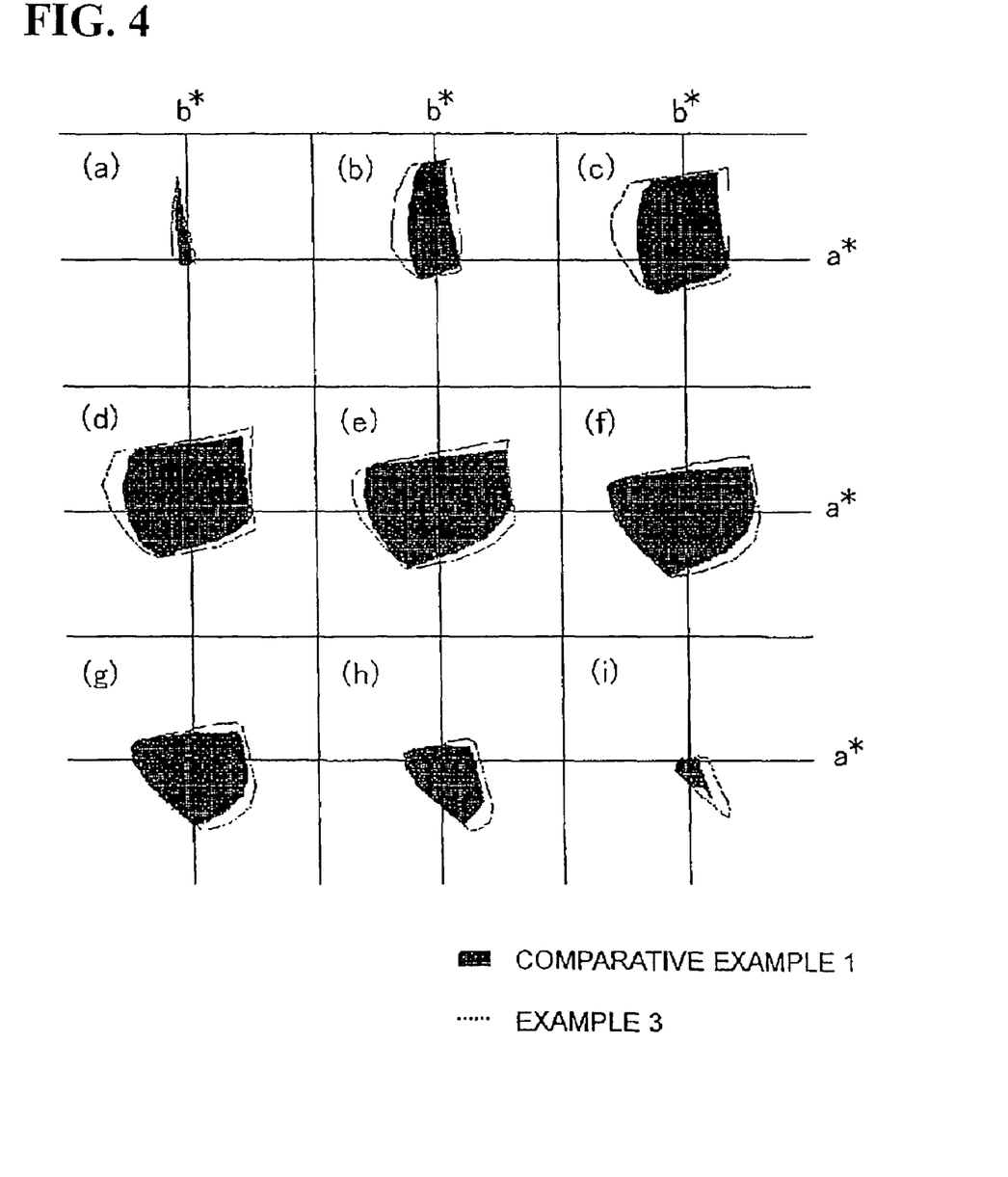
FIG. 4 is a drawing comparing color reproduction areas for patch patterns of the ink sets of Example 3 and Comparative Example 1.

FIG. 4 is a drawing comparing color reproduction areas for patch patterns of the ink sets of Example 3 and Comparative Example 1. The L* values in FIGS. 4A to 41 are the same as the L* values in FIGS. 2A to 21.

Furthermore, in the case of adjusting the maximum ink weight per unit surface area of the recording medium to 11 to 12 mg/inch$^2$, the color reproduction areas of Examples 1, 7 and 8 were the same. The reason for the color reproduction areas being the same is that the color reproduction area became saturated at an ink weight less than the maximum ink weight.

Color reproducibility was evaluated by visualizing color areas I to III of the resulting recorded articles, and observing the degree of color reproducibility in each color area. Here, color area I refers to a blue area having an L* value of 70 to 10, color area 11 refers to a red area having an L* value of 80 to 20, and color area III refers to a green area having an L* value of 90 to 50.

A: All color areas I, II and III are able to be reproduced.
B: Only color areas I and II are able to be reproduced, while color area III is unable to be reproduced
C: Only color area I able to be reproduced, while color areas II and III are unable to be reproduced
D: None of color areas I, II and III are able to be reproduced

TEST EXAMPLE 2

Evaluation of Gloss

Values for the 45 degree specular gloss at an area of 60% duty of the recorded articles used in Test Example 1 were measured using the GP-200 Goniophotometer (trade name: Murakami Color Research Laboratory Co., Ltd.) to evaluate gloss based on the criteria indicated below. Those results are shown in Table 1.

TABLE 1

| Sample | Test Example 1 (Color Reproducibility) | Test Example 2 (Gloss) |
|---|---|---|
| Example 1 | C | A |
| Example 2 | B | A |
| Example 3 | A | A |
| Example 4 | C | A |
| Example 5 | B | A |
| Example 6 | A | A |
| Example 7 | B | A |
| Example 8 | A | A |
| Comparative Example 1 | D | B |

A: Gloss of 25 or more
B: Gloss of less than 25

According to the present invention, an ink set capable of realizing both improvement of color reproducibility and gloss when recording onto a recording medium, a recording method and a recorded article can be provided.

What is claimed is:

1. An ink set, comprising at least a magenta ink composition, a yellow ink composition, a green ink composition and a cyan ink composition; wherein
   the magenta ink composition has an L* value of 60 or more and a b* value of −17 or less when the CIE standard a* value as calculated from the visible absorption spectrum in an aqueous solution diluted 10,000-fold or less is 80.

2. The ink set according to claim 1, wherein the magenta ink composition has a CIE standard L* value of 96 or more and a* value of 7.5 or more as calculated from the visible absorption spectrum in an aqueous solution having a pigment solid component concentration of $2\times10^{-3}$ g/l.

3. The ink set according to claim 1, wherein the magenta ink composition has an a* value of 11.5 or more and a b* value of −5.5 or less when the CIE standard L* value as calculated from the visible absorption spectrum in an aqueous solution diluted 10,000-fold or more is 94.

4. The ink set according to claim 1, wherein the magenta ink composition at least contains a solid solution of γ-type C.I. pigment violet 19 and C.I. pigment red 202.

5. The ink set according to claim 1, wherein the colorant of the yellow ink composition is one or more types selected from the group consisting of C.I. pigment yellow 74, 128, 129, 151, 153, 155, 174, 180, 188 and 198.

6. The ink set according to claim 1, wherein the colorant of the cyan ink composition is selected from one or more types selected from the group consisting of C.I. pigment blue 15:1, 15:2, 15:3, 15:4 and 16 and C.I. vat blue 4 and 60.

7. The ink set according to any claim 1, further comprising an orange ink composition.

8. The ink set according to claim 7, wherein the colorant of the orange ink composition is a pigment of C.I. pigment orange 43 and/or 36.

9. The ink set according to claim 7, wherein the colorant of the orange ink composition is a pigment of C.I. pigment 43 and/or 242.

10. The ink set according to claim 7, wherein the mixing ratio of the colorants of the orange ink composition is such that the ratio of C.I. pigment orange 43 to C.I. pigment red 242 is 4:1 to 2:1.

11. The ink set according to claim 1, wherein the colorant of the green ink composition is a pigment of C.I. pigment green 7 and/or 36.

12. The ink set according to claim 1, further comprising a black ink composition.

13. The ink set according to claim 12, wherein the colorant of the black ink composition comprises C.I. pigment black 7 and one or more selected from the group consisting of C.I. pigment blue 15:1, 15:2, 15:3, 15:4 and 16 and C.I. vat blue 4 and 60.

14. The ink set according to claim 1, wherein the pigment solid component concentration of each ink composition is 3% by weight or more.

15. The ink set according to claim 1, wherein the ink set is provided with ink compositions in which the colors are mutually the same but the pigment solid component concentrations are different.

16. The ink set according to claim 15, wherein the ink set is provided with at least an ink composition in which the pigment solid component concentration of each ink composition is 2.5% by weight or less, and an ink composition in which the pigment solid component concentration of each ink composition is greater than 2.5% by weight.

17. The ink set according to claim 15, containing at least a black ink composition in which the pigment solid component concentration is less than 1% by weight, and a black ink composition in which the pigment solid component concentration is 1 to 3% by weight.

18. The ink set according to claim 1, wherein one or more types of the magenta ink composition, the yellow ink composition and the cyan ink composition contain a white pigment.

19. The ink set according to claim 18, wherein the white pigment is titanium dioxide or zirconia dioxide.

20. The ink set according to claim 1, wherein each ink composition contains one or more of a wetting agent in the form of a polyvalent alcohol, a sugar or a polyvalent alcohol having an ethylene oxide chain.

21. The ink set according to claim 1, wherein each agent ink composition contains one or more of a penetrating in the form of a pyrrolidone, an alkanediol or a glycol ether.

22. The ink set according to claim 1, wherein each ink composition contains one or more of a surfactant in the form of an acetylene glycol or a polysiloxane.

23. The ink set according to claim 22, wherein the polysiloxane is a polyorganosiloxane represented by the following general formula:

wherein R represents a hydrogen atom or a methyl group, a represents an integer of 7 to 11, m represents an integer of 20 to 70, and n represents an integer of 2 to 5.

24. The ink set according to claim 22, wherein the polysiloxane further includes a polyorganosiloxane represented by the following general formula:

wherein R represents a hydrogen atom or a methyl group, a represents an integer of 2 to 13, m represents an integer of 2 to 4, and n represents an integer of 1 to 2.

25. The ink set according to claim 1, wherein each ink composition contains an alkanediol.

26. The ink set according to claim 25, wherein the alkanediol is a branched 1,2-alkanediol.

27. The ink set according to claim 1, wherein each ink composition contains a polyorganosiloxane.

28. The ink set according to claim 1, wherein the surface tension of each ink composition is 25 mN/m or less.

29. A method comprising providing the ink set according to claim 1, and performing ink jet recording with the ink set.

30. A recording method comprising providing an ink composition constituting the ink set according to claim 1, and adhering the ink composition and printing onto a recording medium.

31. An ink jet recording method comprising providing an ink composition constituting the ink set according to claim 1, and printing by discharging droplets of the ink composition and adhering the droplets to a recording medium.

32. A recorded article printed according to the recording method described in claim 30.

33. An ink set, comprising at least a magenta ink composition, a yellow ink composition, a black ink composition and a cyan ink composition; wherein
the magenta ink composition has an L* value of 60 or more and a b* value of −17 or less when the CIE standard a* value as calculated from the visible absorption spectrum in an aqueous solution diluted 10,000-fold or less is 80, wherein the colorant of the black ink composition comprises C.I. pigment black 7 and one or more selected from the group consisting of C.I. pigment blue 15:1, 15:2, 15:3, 15:4 and 16 and C.I. vat blue 4 and 60.

34. The ink set according to claim 33, wherein the magenta ink composition has a CIE standard L* value of 96 or more and a* value of 7.5 or more as calculated from the visible absorption spectrum in an aqueous solution having a pigment solid component concentration of $2 \times 10^{-3}$ g/l.

35. The ink set according to claim 33, wherein the magenta ink composition has an a* value of 11.5 or more and a b* value of −5.5 or less when the CIE standard L* value as calculated from the visible absorption spectrum in an aqueous solution diluted 10,000-fold or more is 94.

36. The ink set according to claim 33, wherein the magenta ink composition at least contains a solid solution of γ-type C.I. pigment violet 19 and C.I. pigment red 202.

37. The ink set according to claim 1, wherein the colorant of the yellow ink composition is one or more types selected from the group consisting of C.I. pigment yellow 74, 128, 129, 151, 153, 155, 174, 180, 188 and 198.

38. The ink set according to claim 33, wherein the colorant of the cyan ink composition is selected from one or more types selected from the group consisting of C.I. pigment blue 15:1, 15:2, 15:3, 15:4 and 16 and C.I. vat blue 4 and 60.

39. The ink set according to any claim 33, further comprising an orange ink composition.

40. The ink set according to claim 39 wherein the colorant of the orange ink composition is a pigment of C.I. pigment orange 43 and/or 36.

41. The ink set according to claim 39 wherein the colorant of the orange ink composition is a pigment of C.I. pigment orange 43 and/or pigment red 242.

42. The ink set according to claim 39 wherein the mixing ratio of the colorants of the orange ink composition is such that the ratio of C.I. pigment orange 43 to C.I. pigment red 242 is 4:1 to 2:1.

43. The ink set according to claim 33, further comprising a green ink composition.

44. The ink set according to claim 43, wherein the colorant of the green ink composition is a pigment of C.I. pigment green 7 and/or 36.

45. The ink set according to claim 33, wherein the pigment solid component concentration of each ink composition is 3% by weight or more.

46. The ink set according to claim 33, wherein the ink set is provided with ink compositions in which the colors are mutually the same but the pigment solid component concentrations are different.

47. The ink set according to claim 46, wherein the ink set is provided with at least an ink composition in which the pigment solid component concentration of each ink composition is 2.5% by weight or less, and an ink composition in which the pigment solid component concentration of each ink composition is greater than 2.5% by weight.

48. The ink set according to claim 46, containing at least a black ink composition in which the pigment solid component concentration is less than 1% by weight, and a black ink composition in which the pigment solid component concentration is 1 to 3% by weight.

49. The ink set according to claim 33, wherein one or more types of the magenta ink composition, the yellow ink composition and the cyan ink composition contain a white pigment.

50. The ink set according to claim 49, wherein the white pigment is titanium dioxide or zirconia dioxide.

51. The ink set according to claim 33, wherein each ink composition contains one or more of a wetting agent in the form of a polyvalent alcohol, a sugar or a polyvalent alcohol having an ethylene oxide chain.

52. The ink set according to claim 33, wherein each ink composition contains one or more of a penetrating agent in the form of a pyrrolidone, an alkanediol or a glycol ether.

53. The ink set according to claim 33, wherein each ink composition contains one or more of a surfactant in the form of an acetylene glycol or a polysiloxane.

54. The ink set according to claim 53, wherein the polysiloxane is a polyorganosiloxane represented by the following general formula:

wherein R represents a hydrogen atom or a methyl group, a represents an integer of 7 to 11, m represents an integer of 20 to 70, and n represents an integer of 2 to 5.

55. The ink set according to claim 53, wherein the polysiloxane further includes a polyorganosiloxane represented by the following general formula:

wherein R represents a hydrogen atom or a methyl group, a represents an integer of 2 to 13, m represents an integer of 2 to 4, and n represents an integer of 1 to 2.

56. The ink set according to claim 33, wherein each ink composition contains an alkanediol.

57. The ink set according to claim 56, wherein the alkanediol is a branched 1,2-alkanediol.

58. The ink set according to claim 33, wherein each ink composition contains a polyorganosiloxane.

59. The ink set according to claim 33, wherein the surface tension of each ink composition is 25 mN/m or less.

60. A method comprising providing the ink set according to claim 33, and performing ink jet recording with the ink set.

61. A recording method comprising providing an ink composition constituting the ink set according to claim 33, and adhering the ink composition and printing onto a recording medium.

62. An ink jet recording method comprising providing an ink composition constituting the ink set according to claim 33, and printing by discharging droplets of the ink composition and adhering the droplets to a recording medium.

63. A recorded article printed according to the recording method described in claim 61.

* * * * *